(12) United States Patent
Marr et al.

(10) Patent No.: US 10,507,928 B2
(45) Date of Patent: Dec. 17, 2019

(54) HIGH EFFICIENCY ELECTRICALLY DRIVEN ENVIRONMENTAL CONTROL SYSTEM

(71) Applicant: HONEYWELL INTERNATIONAL INC., Morris Plains, NJ (US)

(72) Inventors: Nicholas James Marr, Yeovil (GB); Jan Ludvik, Jesenice (CZ); Mike Zaple, Yeovil (GB)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 196 days.

(21) Appl. No.: 15/625,152

(22) Filed: Jun. 16, 2017

(65) Prior Publication Data

US 2018/0362166 A1  Dec. 20, 2018

(51) Int. Cl.
*B64D 13/08*  (2006.01)
*B64D 13/06*  (2006.01)

(52) U.S. Cl.
CPC ...... *B64D 13/08* (2013.01); *B64D 2013/0614* (2013.01); *B64D 2013/0648* (2013.01); *B64D 2013/0688* (2013.01)

(58) Field of Classification Search
CPC ............ B64D 13/08; B64D 2013/0614; B64D 2013/0648; B64D 2013/0688; B64D 13/02; Y02T 50/56
See application file for complete search history.

(56) References Cited

U.S. PATENT DOCUMENTS 4,347,711 A * 9/1982 Noe ...................... F01K 23/101
60/39.181

5,086,622 A  2/1992 Warner
(Continued)

FOREIGN PATENT DOCUMENTS

WO  WO2016034830 A1  3/2016

OTHER PUBLICATIONS

Search & opinion, EP application No. 18166427.7, dated Oct. 25, 2018.

*Primary Examiner* — Henry T Crenshaw
(74) *Attorney, Agent, or Firm* — Shimokaji IP

(57) ABSTRACT

An environmental control system includes a pair of parallel operating environmental air compressors (EACs) that receive a first outside air, wherein each EAC includes a respective EAC compressor and EAC turbine. A first regenerative heat exchanger is downstream of the EAC compressors and upstream of the EAC turbines, wherein the first regenerative heat exchanger receives environmental air from an enclosure for occupants. A primary heat exchanger is downstream of the first regenerative heat exchanger, wherein the primary heat exchanger receives a second outside air. An air cycle machine (ACM) is downstream of the primary heat exchanger. A condenser is downstream of the ACM, wherein a conditioned air exits the condenser and into the enclosure. A water extractor is downstream of the condenser. A reheater is downstream of the water extractor and upstream of the ACM. A secondary heat exchanger is downstream of the ACM, wherein the secondary heat exchanger receives the second outside air. An actuated door that controls an amount of second outside air to the primary heat exchanger and to the secondary heat exchanger, wherein, in a second outside air flow, the primary heat exchanger is downstream of the secondary heat exchanger.

11 Claims, 3 Drawing Sheets

(56) References Cited

U.S. PATENT DOCUMENTS

| | | | |
|---|---|---|---|
| 5,461,882 A | 10/1995 | Zywiak | |
| 5,704,218 A * | 1/1998 | Christians | B64D 13/06 62/172 |
| 5,911,388 A | 6/1999 | Severson et al. | |
| 5,967,461 A | 10/1999 | Farrington | |
| 6,457,318 B1 * | 10/2002 | Lui | B64D 13/06 62/402 |
| 7,849,702 B2 | 12/2010 | Parikh | |
| 8,360,358 B2 | 1/2013 | Klimpel | |
| 9,126,687 B2 * | 9/2015 | Zywiak | B64D 13/06 |
| 9,249,728 B2 * | 2/2016 | Lim | F02C 6/16 |
| 9,481,468 B1 * | 11/2016 | Schiff | B64D 13/00 |
| 2009/0117840 A1 * | 5/2009 | Kresser | B64D 13/06 454/71 |
| 2014/0144163 A1 * | 5/2014 | Klimpel | B64D 13/08 62/89 |
| 2016/0347456 A1 * | 12/2016 | Bruno | B64D 13/06 |
| 2017/0275004 A1 * | 9/2017 | Bammann | B64D 13/04 |
| 2017/0355466 A1 * | 12/2017 | Galzin | B64D 13/06 |

* cited by examiner

HIGH EFFICIENCY ELECTRICALLY DRIVEN ENVIRONMENTAL CONTROL SYSTEM

BACKGROUND OF THE INVENTION

The present invention generally relates to environmental control systems (ECSs) and, more particularly, to apparatus and methods of more-electric architectures (MEAs) in ECSs for fuel burn savings.

Environmental control systems (ECSs) can be designed with a two-wheel air cycle machine (ACM), together with a primary heat exchanger, air compressors, motors to drive the air compressors, a condenser, a water extractor, a reheater, and a regenerative heat exchanger.

An ECS design has to address issues of cost, weight, and complexity. It needs to do so in differing operating contexts. For example, in aircraft, an ECS may need to operate differently on the ground versus in flight in order to achieve operating efficiencies. Efficiencies can potentially be achieved by introducing the energy recuperation of the ECS. They can also be potentially achieved by reduction of system weight, component size, and number of components.

Driven by the demand to optimize aircraft performance, while decreasing operating and maintenance costs, the aircraft industry has pushed towards the concept of more electric aircraft (MEA), and ultimately an all-electric aircraft. Specifically, the MEA concept provides for the utilization of electric power for all non-propulsive systems.

As can be seen, there is a need for improved apparatus and methods to reduce fuel burn in an ECS.

SUMMARY OF THE INVENTION

In one aspect of the present invention, an environmental control system comprises a pair of parallel operating environmental air compressors (EACs) that receive a first outside air, wherein each EAC includes a respective EAC compressor and EAC turbine; a first regenerative heat exchanger downstream of the EAC compressors and upstream of the EAC turbines, wherein the first regenerative heat exchanger receives environmental air from an enclosure for occupants; a primary heat exchanger downstream of the first regenerative heat exchanger, wherein the primary heat exchanger receives a second outside air; an air cycle machine (ACM) downstream of the primary heat exchanger; a condenser downstream of the ACM, wherein a conditioned air exits the condenser and into the enclosure; a water extractor downstream of the condenser; a reheater downstream of the water extractor and upstream of the ACM; a secondary heat exchanger downstream of the ACM, wherein the secondary heat exchanger receives the second outside air; and an actuated door that controls an amount of second outside air to the primary heat exchanger and to the secondary heat exchanger, wherein, in a second outside air flow, the primary heat exchanger is downstream of the secondary heat exchanger.

In another aspect of the present invention, an environmental control system comprises a pair of environmental air compressors (EACs) that receive a first outside air and exhaust a combined EAC exit air flow; a first regenerative heat exchanger downstream of the EACs, wherein the first regenerative heat exchanger receives environmental air from an enclosure for occupants and returns the environmental air to the EACs; a primary heat exchanger downstream of the first regenerative heat exchanger, wherein the primary heat exchanger receives a second outside air; an air cycle machine (ACM) compressor downstream of the primary heat exchanger; an ACM turbine downstream of the ACM compressor; a condenser downstream of the ACM turbine, wherein a conditioned air exists the condenser and into the enclosure; a water extractor downstream of the condenser; a reheater downstream of the water extractor and upstream of the ACM turbine; a secondary heat exchanger downstream of the ACM compressor, wherein the secondary heat exchanger receives the second outside air and exhausts air that can flow to the enclosure; a second outside air system that controls an amount of second outside air to the primary heat exchanger and the secondary heat exchanger; and a second regenerative heat exchanger operatively adjacent to the first regenerative heat exchanger.

In a further aspect of the present invention, an environmental control system comprises a pair of parallel operating environmental air compressors (EACs) that receive a first outside air, wherein each EAC includes a respective EAC compressor and EAC turbine; a first regenerative heat exchanger downstream of the EAC compressors, wherein the first regenerative heat exchanger receives environmental air from an enclosure for occupants; a primary heat exchanger downstream of the first regenerative heat exchanger, wherein the primary heat exchanger receives a second outside air; an air cycle machine (ACM) downstream of the primary heat exchanger; a condenser downstream of the ACM, wherein a conditioned air exits the condenser and into the enclosure; a water extractor downstream of the condenser; a reheater downstream of the water extractor; a secondary heat exchanger downstream of the ACM, wherein the secondary heat exchanger receives the second outside air; a second outside air system that controls an amount of second outside air to the primary heat exchanger and the secondary heat exchanger; and wherein an EAC exit air flow mixes with the second outside air in the second outside air system.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

Broadly, the present invention provides an ECS that can be implemented in different applications, such as vehicles, including aircraft. In any given application, the ECS may condition air being supplied to an interior environment that is suitable for human occupants. In the context of aircraft, the interior environment can be the passenger cabin.

The present invention can combine a high pressure water extraction ECS pack with turbine/motor driven environmental air compressors (EACs) that use energy recovered from an interior environment (e.g., passenger cabin) exhaust (i.e., recirculated) air to assist in driving one or more of the EACs in flight. Also, the present invention may use a regenerative heat exchanger between the interior environment and one or more of the EAC turbines. This regenerative heat exchanger can use the high pressure/high temperature air from the EAC(s) to heat the interior environment air prior to entering the turbine and cool the EAC air supplied to the ECS pack. Further, the present invention may limit the ECS pack secondary heat exchanger efficiency in order to minimize ram flow by controlling the secondary heat exchanger outlet temperature.

Herein, the term "directly" is intended to mean, in the context of two components being upstream or downstream of one another, that the two components are connected to one another without a third component therebetween, other than a means for air flow connection, such as a duct, between the two components.

Figure 1:
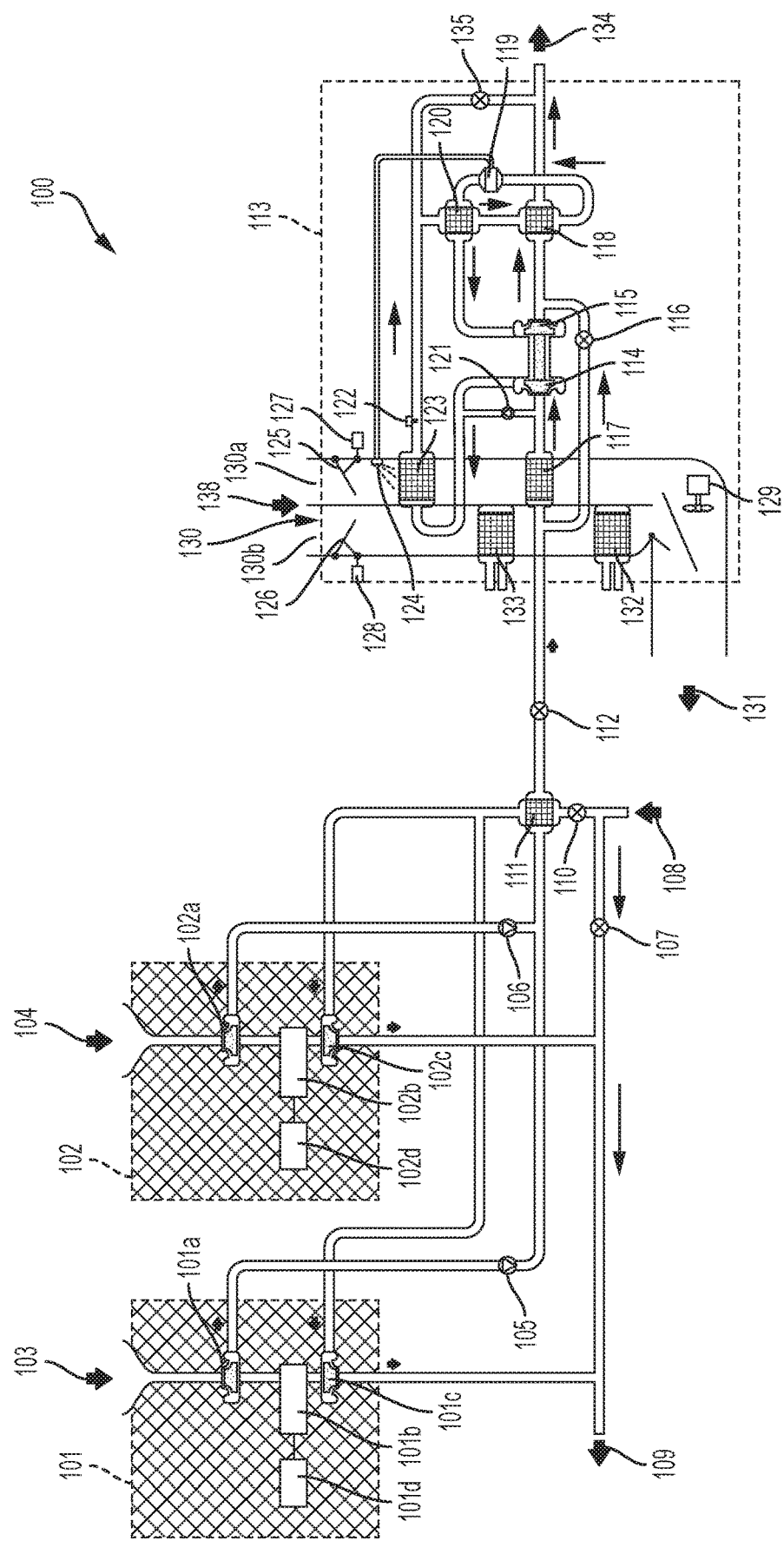
FIG. 1 is a schematic diagram of an environmental control system (ECS) in accordance with an exemplary embodiment of the present invention.

FIG. 1 is a schematic diagram of an exemplary embodiment of an environmental control system (ECS) 100. The ECS 100 may include at least one environmental air compressor (EAC)—such as EACs 101, 102—and at least one ECS pack—such as pack 113.

In an embodiment, first and second parallel operating EACs 101, 102 can be provided. However, the present invention contemplates that more than two EACs may be implemented. The first EAC 101 may include an EAC compressor 101a, a downstream EAC turbine 101c, and an EAC motor 101b therebetween. An EAC motor controller 101d may control the motor 101b. The second EAC 102 may have a design similar to the EAC 101. Thus, in an embodiment, the second EAC 102 may include an EAC compressor 102a, an EAC motor 102b, an EAC turbine 102c, and an EAC motor controller 102d. However, the second EAC 102 may have a design different from the first EAC 101.

The first and second EACs 101, 102 may receive a first outside air, such as first outside air 103, 104. In an embodiment, the first outside air 103, 104 may be from a same source, such as ram air in the context of an aircraft. However, the outside air 103, 104 may be from different sources.

From the first EAC turbine 101c, air may flow directly to an environment outside of the system 100, such as overboard 109. Similarly, from the second EAC turbine 102c, air may flow directly to the outside environment, such as overboard 109.

From the first EAC compressor 101a, a first EAC exit air flow may move to a directly downstream check valve 105, and then to a directly downstream regenerative heat exchanger 111. Similarly, from the second EAC compressor 102a, a second EAC exit air flow may move to a directly downstream check valve 106, and then to the directly downstream regenerative heat exchanger 111. The first and second EAC exit air flows may be considered a combined EAC exit air flow.

The regenerative heat exchanger 111 may receive, via a valve 110, environmental or recirculated air 108 from an interior environment or enclosure for occupants, such as the passenger cabin of an aircraft. The environmental air 108, upon exiting the regenerative heat exchanger 111, may flow directly to one or both of the EAC turbines 101c, 102c.

Instead of the environmental air 108 flowing through the valve 110, the environmental air 108 may flow through a directly downstream valve 107 and then directly as overboard 109.

From the regenerative heat exchanger 111, air may flow directly through a control valve 112 and then directly into the ECS pack 113. However, the present invention contemplates that more than one ECS pack may be employed.

The ECS pack 113 may include a primary heat exchanger (PHX) 117 that directly receives air from the valve 112. Alternatively, or in addition, air from the control valve 112 may bypass the PHX 117 and flow through a directly downstream control valve 116 and eventually exit the ECS pack 113 as conditioned air 134 further described below.

Air from the valve 112 and exiting the PHX 117 may flow through a directly downstream valve 121 and/or through a directly downstream air cycle machine (ACM) that includes an ACM compressor 114 and an ACM turbine 115. Alternatively, or in addition, air exiting the PHX 117 may bypass the ACM and flow through a directly downstream control valve and eventually exit the ECS pack 113 as conditioned air 134 further described below in FIGS. 2 and 3. The two control valves could be in parallel or series with a check valve on the supply from the PHX outlet. If through the valve 121, the flow may enter a secondary heat exchanger (SHX) 123 further described below. If through the ACM compressor 114, the air exiting therefrom may enter the directly downstream SHX 123.

A condenser 118 may be directly downstream of the ACM turbine 115 and receive air therefrom. The air into the condenser 118 may also include air from the control valve 116. The air exiting the condenser 118 may exit the pack 113 as conditioned air 134 for the interior environment, such as the passenger cabin.

Air entering the SHX 123 from the valve 121 and/or ACM compressor 114 may exit the SHX 123 and then be sensed by a temperature sensor 122. From the sensor 122, air may flow to a directly downstream reheater 120 and/or to a control valve 135. If the air flows through the control valve 135, the air can mix with air from the condenser 118 and exit the ECS pack 113 as conditioned air 134. If the air from the sensor 122 flows through the reheater 120, the air moves into the directly downstream condenser 115.

From the condenser 115, the air may flow to a directly downstream water extractor 119. From the water extractor 119, the air may flow back into the directly downstream reheater 120. From the reheater 120, air may flow into the directly downstream ECS turbine 115.

Also, from the water extractor 119, water may flow out of an outlet 124 that is located in or adjacent a second outside air system 130 in the ECS pack 113. The second outside air system 130 may receive a second outside air 138, such as ram air in the context of an aircraft. In embodiments, the second outside air 138 may be a same or a different air source as the first outside air 103, 104. In embodiments, the second outside air system 130 may have a first cooling section 130a and a second cooling section 130b.

The amount of second outside air 138 flowing into the outside air system 130 may be controlled by one or more doors 125, 126 that may be respectively actuated by one or more actuators 127, 128. The doors 125, 126 may be fully opened, fully closed, or partially opened independently of one another. In embodiments, each of the doors 125, 126 may respectively control the amount of second outside air flowing into the cooling sections 130a, 130b.

In embodiments, the PHX 117 may be operatively adjacent to or in the first cooling section 130a.

Also operatively adjacent to or in the first cooling section 130a may be the secondary heat exchanger (SHX) 123 which, in a second outside air flow, is directly upstream of the PHX 117. Also, the SHX 123 may be operatively adjacent to the outlet 124, thereby enabling the SHX 123 to receive water from the water extractor 119.

In embodiments, one or more liquid cooling loops 132, 133 may be in heat exchange relationship with, by being operatively adjacent to or in, the second cooling section 130b. One or more of the cooling loops 132, 133 may be employed to cool avionics, as an example.

In embodiments, a fan 129 may be in the second outside air system 130 and downstream of the cooling loops 132, 133, as well as the PHX 117 and the SHX 123. The fan 129 may be employed to exhaust second outside air out of the system 130 and to overboard 131.

Figure 2:
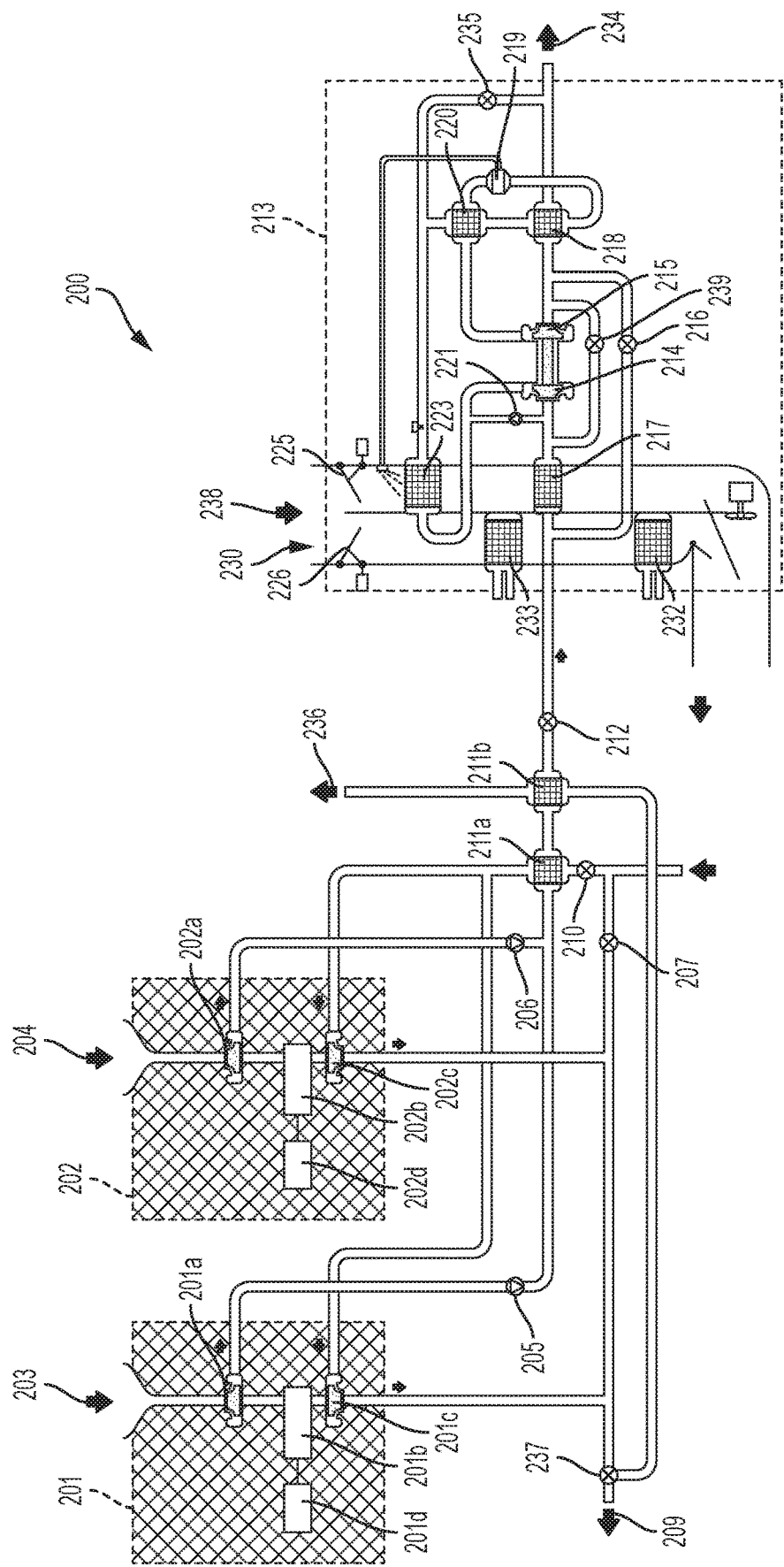
FIG. 2 is a schematic diagram of an environmental control system (ECS) in accordance with another exemplary embodiment of the present invention.

FIG. 2 is a schematic diagram of another embodiment of an environmental control system, such as the ECS 200. The ECS 200 is similar to the ECS 100 above. Thus, the reference numbers for the components in ECS 200 are the same as the reference numbers for the components in ECS 100, except for the change in the first of three digits of the reference numbers. Therefore, a description of all reference numbers in FIG. 2 will not be given.

However, the ECS 200 differs from the ECS 100 in that the former provides a return of exhaust from the environmental air compressors to a second regenerative heat exchanger. That can be implemented as follows.

Air entering a first regenerative heat exchanger 211a is received from first and second EAC compressors 201a, 202a. Air exiting the first regenerative heat exchanger 211a enters a directly downstream second regenerative heat exchanger 211b. However, the present invention contemplates that the second regenerative heat exchanger 211b could be upstream of the first regenerative heat exchanger 211a.

In either event, combined EAC exit air into the second regenerative heat exchanger 211b can come from first and second environmental air compressors 201, 202, via a three-way valve 237. From the second regenerative heat exchanger 211b, air may be directed to an environment outside of the system 200, such as overboard 236.

As noted above, the embodiment of FIG. 2 also includes a check valve 239 that is downstream of the PHX 217 to bypass the ACM compressor 214 and ACM turbine 215.

Figure 3:
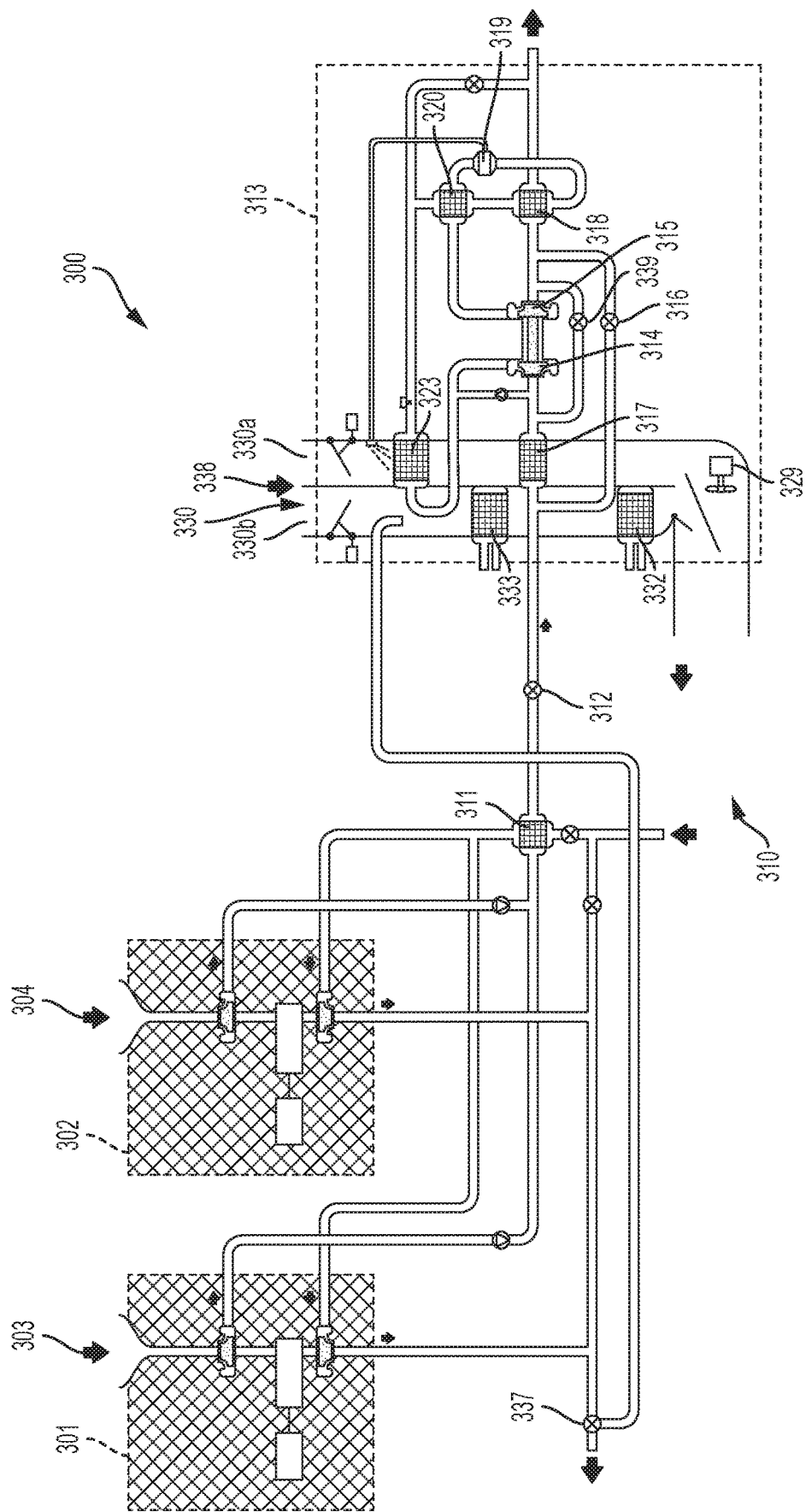
FIG. 3 is a schematic diagram of an environmental control system (ECS) in accordance with yet another exemplary embodiment of the present invention.

FIG. 3 is a schematic diagram of another embodiment of an environmental control system, such as the ECS 300. The ECS 300 is similar to the ECS 100 above. Thus, the reference numbers for the components in ECS 300 are the same as the reference numbers for the components in ECS 100, except for the change in the first of three digits of the reference numbers. Therefore, a description of all reference numbers in FIG. 3 will not be given.

However, the ECS 300 differs from the ECS 100 in that the former provides a return of exhaust from the environmental air compressors to the second cooling section of the outside air system. That can be implemented as follows.

Combined EAC exit air exiting the first and/or second environmental compressors 301, 302 may enter a three-way valve 337. Air from the valve 337 may be directed into the second cooling section 330b of the second outside air system 330. In embodiments, the air entering the second cooling section 330b may be at a location upstream of the PHX 332 and/or upstream of the SHX 333 or upstream of liquid cooling loops.

As noted above, the embodiment of FIG. 3 also includes a check valve 339 that is downstream of the PHX 317 to bypass the ACM compressor 314 and ACM turbine 315.

It should be understood, of course, that the foregoing relates to exemplary embodiments of the invention and that modifications may be made without departing from the spirit and scope of the invention as set forth in the following claims.

We claim:

1. An environmental control system, comprising:
   a pair of parallel operating units that receive outside air from a first source, wherein each unit includes a respective compressor and turbine;
   a first regenerative heat exchanger downstream of the compressors and upstream of the turbines, wherein the first regenerative heat exchanger receives environmental air from an enclosure for occupants;
   a primary heat exchanger downstream of the first regenerative heat exchanger, wherein the primary heat exchanger receives outside air from a second source;
   an air cycle machine (ACM) downstream of the primary heat exchanger;
   a condenser downstream of the ACM, wherein a conditioned air exits the condenser and into the enclosure;
   a water extractor downstream of the condenser;
   a reheater downstream of the water extractor and upstream of the ACM;
   a secondary heat exchanger downstream of the ACM, wherein the secondary heat exchanger receives the outside air from the second source; and
   an actuated door that controls an amount of outside air from the second source to the primary heat exchanger and to the secondary heat exchanger, wherein, in a second outside air flow, the primary heat exchanger is downstream of the secondary heat exchanger.

2. The system of claim 1, further comprising a second regenerative heat exchanger downstream of the first regenerative heat exchanger, wherein the second regenerative heat exchanger receives a unit exit air flow and exhausts air to an environment outside of the system.

3. The system of claim 1, wherein the secondary heat exchanger is downstream of an ACM compressor of the ACM.

4. The system of claim 1, wherein the condenser is downstream of an ACM turbine of the ACM.

5. The system of claim 1, wherein the reheater is upstream of an ACM turbine of the ACM.

6. An environmental control system, comprising:
   a pair of units that receive outside air from a first source and exhaust a combined unit exit air flow;
   a first regenerative heat exchanger downstream of the units, wherein the first regenerative heat exchanger receives environmental air from an enclosure for occupants and returns the environmental air to the units;
   a primary heat exchanger downstream of the first regenerative heat exchanger, wherein the primary heat exchanger receives outside air from a second source;
   an air cycle machine (ACM) compressor downstream of the primary heat exchanger;
   an ACM turbine downstream of the ACM compressor;
   a condenser downstream of the ACM turbine, wherein a conditioned air exists the condenser and into the enclosure;
   a water extractor downstream of the condenser;

a reheater downstream of the water extractor and upstream of the ACM turbine;

a secondary heat exchanger downstream of the ACM compressor, wherein the secondary heat exchanger receives outside air from the second source and, upon heat exchange with air from the ACM compressor, discharges conditioned air that can flow to the enclosure;

a second outside air system that controls an amount of second outside air from the second source to the primary heat exchanger and the secondary heat exchanger; and a second regenerative heat exchanger operatively adjacent to the first regenerative heat exchanger.

7. The system of claim 6, wherein the second regenerative heat exchanger is upstream of the first regenerative heat exchanger.

8. The system of claim 6, wherein the first regenerative heat exchanger is downstream of compressor of each unit.

9. The system of claim 6, wherein the first regenerative heat exchanger is upstream of turbine of each unit.

10. The system of claim 6, wherein the units operate in parallel.

11. The system of claim 6, wherein the second outside air system includes a first cooling section and a second cooling section, and wherein the primary and secondary heat exchangers are both in one of the first and second cooling sections.

* * * * *

UNITED STATES PATENT AND TRADEMARK OFFICE
CERTIFICATE OF CORRECTION

| | | |
|---|---|---|
| PATENT NO. | : 10,507,928 B2 | Page 1 of 1 |
| APPLICATION NO. | : 15/625152 | |
| DATED | : December 17, 2019 | |
| INVENTOR(S) | : Nicholas James Marr, Jan Ludvik and Mike Zaple | |

It is certified that error appears in the above-identified patent and that said Letters Patent is hereby corrected as shown below:

In the Claims

Column 7, Lines 9 and 10, Claim 6 reads: "amount of second outside" should read -- amount of outside --

Signed and Sealed this
Thirteenth Day of February, 2024

Katherine Kelly Vidal
*Director of the United States Patent and Trademark Office*